April 14, 1964 C. E. WALTON 3,128,857
REEL DEVICE
Filed Sept. 26, 1961 3 Sheets-Sheet 1

INVENTOR
CECIL E. WALTON
AGENT.

April 14, 1964 C. E. WALTON 3,128,857
REEL DEVICE
Filed Sept. 26, 1961 3 Sheets-Sheet 2

INVENTOR
CECIL E. WALTON
BY Howard W. Hermann
AGENT.

April 14, 1964

C. E. WALTON 3,128,857

REEL DEVICE

Filed Sept. 26, 1961

INVENTOR
CECIL E. WALTON

BY

Howard W. Hermann

AGENT.

United States Patent Office 3,128,857
Patented Apr. 14, 1964

3,128,857
REEL DEVICE
Cecil E. Walton, Silver Spring, Md., assignor, by mesne assignments, to the United States of America as represented by the Secretary of the Navy
Filed Sept. 26, 1961, Ser. No. 140,962
17 Claims. (Cl. 191—12.2)

This invention relates to a reel for holding a supply of wound electrical cable adapted to have the output end connected to a power receiving device, and, more particularly, a reel adapted to hold a supply of powered electrical cable, said cable receiving its power from a source outside the reel which is connected to the reel in such a manner and by such mechanism that there is no relative rotation between a cable coming into the reel and the rotary portions of the reel itself. The instant invention is directed to a reel structure so constructed that a power supply cable may be run continuously from a power source to the reel and wound onto the reel by such structure that rotation of the reel does not cause twisting of the incoming or input end of said cable when the reel rotates.

An object of this invention is to provide a reel for holding a quantity of powered electrical cable wherein an electrical power source is connected to the cable on the reel in such a manner as to eliminate the need for slip rings and/or commutator bars, and brushes.

A further object of this invention is to provide a means for connecting an electrical supply cable to a rotary member in a manner such as to eliminate the need for slip rings or commutator bars and brushes in connecting the power source to the rotary member.

An added object of this invention is to provide a means for connecting a quantity of electrical cable wound on a reel to a power source by use of a single continuous cable free of any connectors between the output end of the cable and the input end of the cable at the power supply source.

Another object of this invention is to provide means for connecting an electric supply cable to a reel having a quantity of electric wire wound thereon and to said wire in such a manner as to allow rotaton of the reel without twisting of the supply cable relative to the reel at its point of connection to the reel.

Still another object of this invention is to provide a means for connecting a current-carrying electric cable to a quantity of electric wire wound on a rotary reel without the use of slip rings or other relatively slidable connectable elements.

Other objects and many of the attendant advantages of this invention will be readily appreciated as the same become better understood by reference to the following detailed description when considered in connection with the accompanying drawings wherein.

Figure 1:
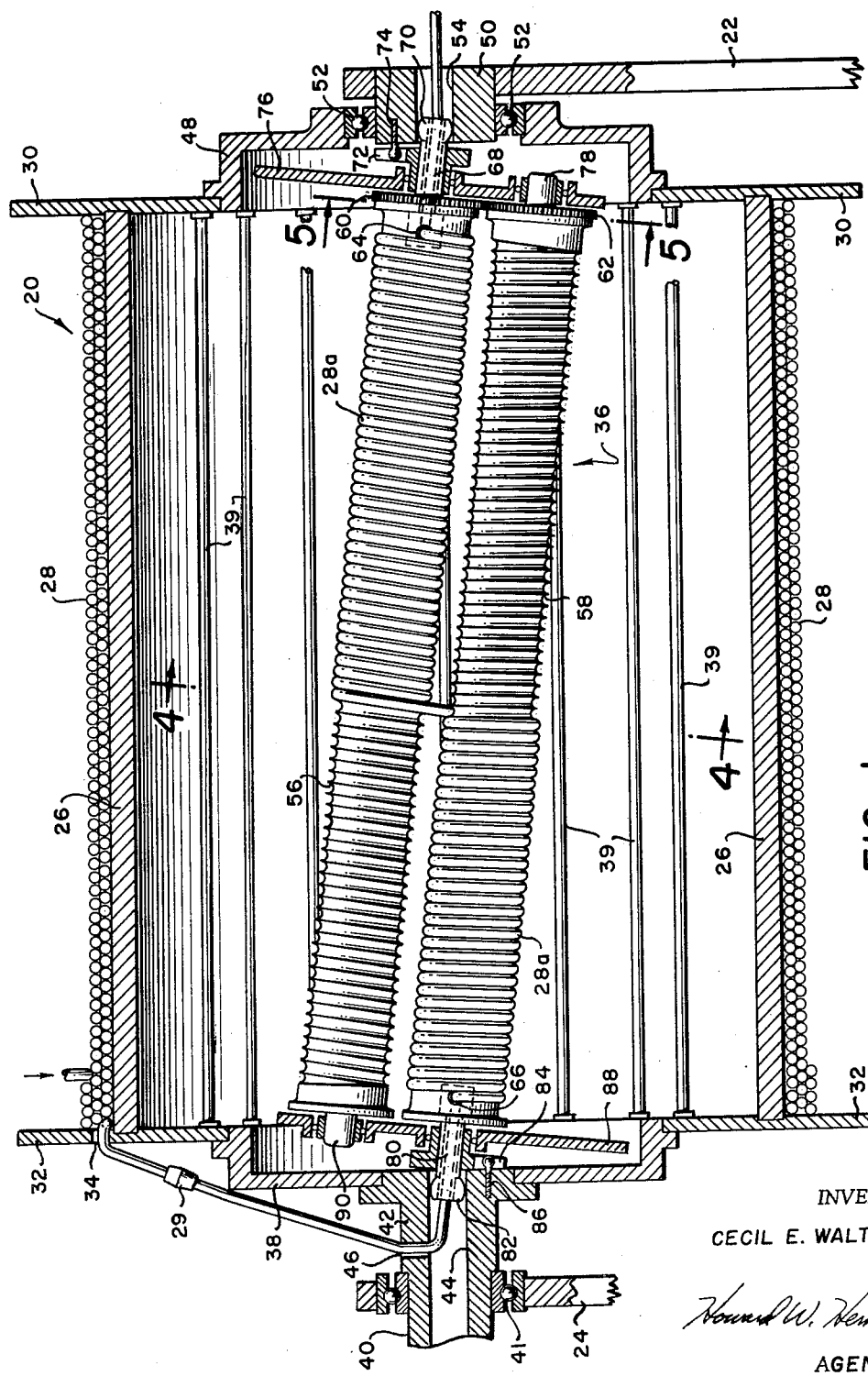
FIG. 1 is an elevation view, partly in section, of an embodiment of the reel construction forming the instant invention.
Figure 5:
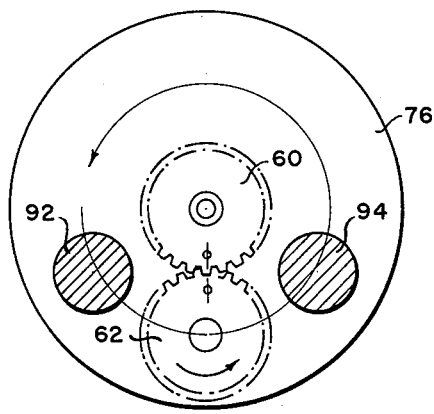
Figure 5A:
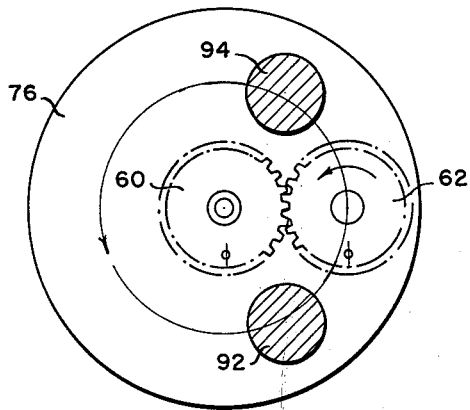
Figure 5B:
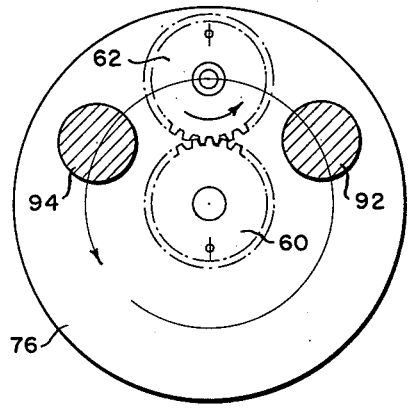

FIGS. 5, 5(a) and 5(b) are sectional views each taken on line 5—5 of FIG. 1 and showing elements of the interior of the reel at various relative positions during rotation of the structure.

Referring now to the drawings when like reference characters designate like or corresponding parts throughout the several views, there is shown in FIG. 1 a reel assembly 20 constructed in accordance with the instant invention. The reel 20 is rotatably mounted on a fixed right hand pedestal support 22 and a left hand pedestal support 24.

The reel assembly 20 includes an outermost rotary drum 26 that is essentially cylindrical in shape and has wound about the periphery thereof a quantity of electrical cable 28. The drum 26 has affixed to its respective ends a right end flange or plate 30 and a left end plate 32. The left end plate assembly 32 has a hole 34 extending therethrough adjacent to the outer surface of the drum 26, and through which the innermost end of the cable 28 on the drum 26 extends in the manner shown in FIG. 1 for purposes hereinafter described. The reel assembly 20 further includes a transfer reel subassembly 36, the construction, operation and purposes of which will be hereinafter described in greater detail.

The left hand end plate assembly 32 includes a fixedly connected cup shaped member 38 facing the inside of the drum 26. The cup shaped member 38 in turn has fixedly connected thereto a shaft assembly 40 rotatably mounted by means of a bearing 41, in the left hand support pedestal 24. The shaft 40 is adapted to be driven by hand crank or by any other suitable source of power. The drum may alternatively be driven by means of a ring gear or pully affixed to one of the flanges 30 or 32 to thereby avoid stresses through a multiplicity of parts. The shaft 40 includes a boss 42 having a passageway 44 extending therethrough. The boss 42 has a hole 46 extending therethrough and through which cable 28 passes to the interior of the drum 26.

The right hand end plate assembly 30 of the drum 26 has fixedly connected thereto a cup shaped member 48 facing the inside of the drum 26. The cup shaped member 48 is rotatably connected by a ballbearing assembly 52 to a boss 50 which is fixedly mounted on the right hand support pedestal 22. The boss 50 has a longitudinal passageway 54 formed therein and extending therethrough.

Figure 2:
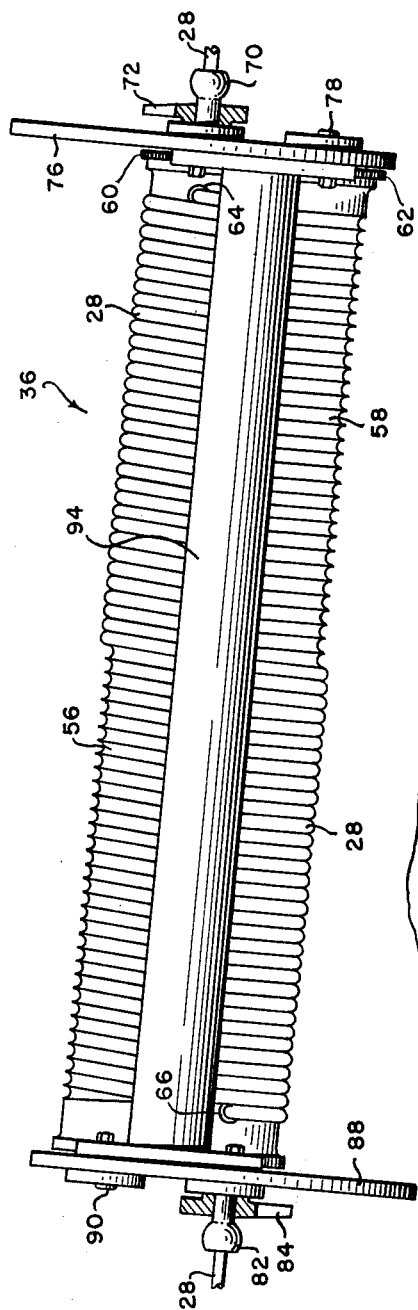
FIG. 2 is an elevational view of a portion of the structure shown in FIG. 1, and showing certain elements omitted in FIG. 1 for the sake of clarity.
Figure 3:
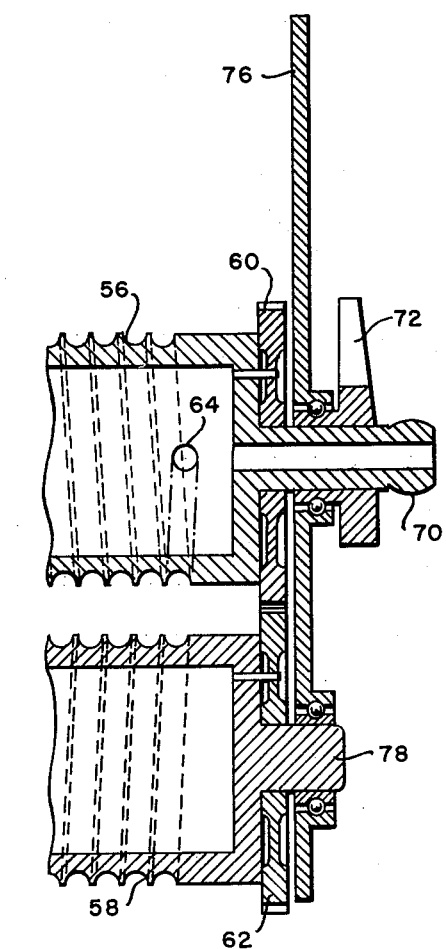
FIG. 3 is an enlarged sectional view of the right hand central portion of the structure shown in FIG. 1.

The transfer roll assembly 36 comprises, as viewed in FIG. 1, a right hand transfer roll 56, and a left hand transfer roll 58, said rolls being respectively designated as right and left since they are respectively connected at their right hand and left hand ends to the drum 26 thru various intermediate elements, described in detail hereinafter. It is preferred that the transfer rolls, be provided (as shown in FIGS. 1–3) with contour threads having a pitch slightly greater than the diameter of the wire to be wound thereon. This facilitates transfer of the wire between rolls 56 and 58.

The right hand roll 56 has a sun gear 60 fixedly attached to its right hand end, which gear is enmeshed with an identical planet gear 62 at the right hand end of the left transfer roll 58. It is emphasized, and will be clear from an examination of FIGS. 3, 5, 5a and 5b that each of the planetary gears 60 and 62 has the same diameter and the same number of teeth and that each is fixedly attached to its transfer roll. The right hand transfer roll 56 is hollow at its right hand end and has a hole 64 formed in the wall thereof and extending into the hollow interior of the roll. The left hand transfer roll 58 is hollow at least at its left hand end and has a hole 66 formed at said left hand end and extending into the hollow interior of the roll.

At its right hand end, right transfer roll 56 is provided with a centrally located tubular boss 68 extending outwardly of said right hand end, said tubular boss having a substantially ball shaped end portion 70, universally, pivotally mounted with the hole 54 in the boss 50. The tubular boss 68 of course has a passageway extending completely therethrough and by means of a hole through the end portion of the transfer roll 56 communicates with the hollow interior of roller 56 and the hole 64 therein. The tubular boss 68 has fixedly mounted thereon a bifurcated yoke 72. The yoke 72 is held against rotation relative to the boss 50 and the right hand support member 22 by means of a stop pin 74 engaged within the bifurcated portion of the yoke 72. The yoke 72 is supported in an end plate 76 which is rotatably carried on a portion of the yoke 72, for purposes hereinafter described.

The right hand end of the left transfer roll 58 is provided with a stud 78 that is rotatably mounted in the aforementioned end plate 76. Thus the end plate 76, which may be circular in form, is rotatably connected to a portion of the yoke 72 and has rotatably connected thereto the right hand end of the left transfer roll 58.

The left hand end of the left transfer roll 58 is provided with a tubular, fixedly attached boss 80, substantially identical to the tubular boss 68 on the right transfer roll 56. The left roll support boss 80 has a passageway extending axially thereof and in communication with the hollow interior of the left end of the transfer roll 58 and the hole 66 formed at said left end of the transfer roll. The extreme left end of the tubular boss 80 is provided with a ball like portion 82 universally pivotally mounted within a passageway 44 in the boss 42 which is rigidly connected to the drum 26.

Another yoke 84 is fixedly mounted on the tubular boss 80 and has the bifurcated portions thereof astride a stop pin 86 fixedly mounted in the boss 42 so that the stop pin 86 will rotate with and thus cause rotation of the yoke 84 along with the drum 26.

The yoke 84 extends at least partially through and is rotatably mounted in the left hand end roller assembly support plate 88. The left hand end of the right transfer roll 56 has a shaft 90 fixedly mounted thereon and rotatably supported within the support plate 88 in the manner clearly shown in FIG. 1.

In addition to being connected by the transfer rolls 56 and 58, the right and left hand end support plates 76 and 88 are rigidly interconnected by a pair of parallel rods or tubular members 92 and 94 having their respective ends fixed to said end support plates 76 and 88 in order to transfer movement of one end plate to the other in a manner and for reasons hereinafter described. Thus the transfer roll assembly 36 includes the aforementioned transfer rolls 56 and 58 supported at their respective ends by the support plates 76 and 88 and as such constitute an assembly which upon disengagement of the yokes 72 and 84 from the respective pins 74 and 86 allows the entire roll assembly to be removed from inside the drum 26 upon removal of one of the drum end cupshaped members 38 or 48. A plurality of spaced rods 39, interconnecting drum end plates 30 and 32, are provided in order to facilitate such removal. The rods 39 serve as guides to prevent the transfer roller assembly from dropping to the bottom of the reel as it is removed. Obviously, a single hollow cylindrical member could be utilized instead of the spaced rods, if desired, and in smaller embodiments of the system it may sometimes be unnecessary to provide any guides.

Figure 4:
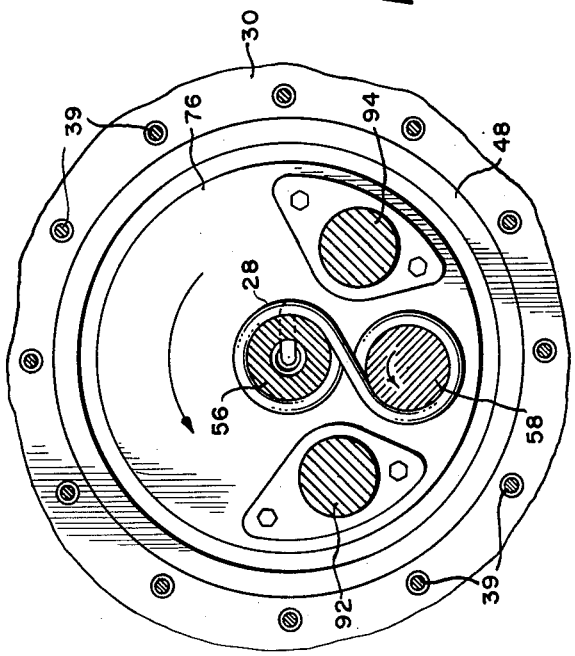
FIG. 4 is a sectional view, on line 4—4 of FIG. 1.

In its fully assembled form, the instant invention includes in addition to the elements set forth above, of course, a quantity of electric cable 28 wound on the outer drum 26. The innermost end of said cable extends through the hole 34 in the left hand end drum plate 32 to an electrical cable connector 29. From connector 29a cable 28a extends thru the hole 46, and the boss 42, thence thru the passageway in the tubular boss 80 at the left hand side of the transfer roll assembly 36, and into the interior of the left hand transfer roller 58. At the left hand end of the roll 58, the cable 28a passes to the exterior of the transfer roll 58 through the hole 66 and is wound about said transfer roll 58 in a clockwise direction as viewed from the left hand end of FIG. 4 and is also wound along the right hand portion of roll 56 in a counterclockwise direction. At the state of operation of the structure shown in FIG. 1, the cable 28a is wound around the left hand transfer roll 58 to approximately the center thereof at which time it transfers to the right hand roll of 56 in the manner shown in FIGS. 1 and 4, being wound around the transfer roll 56 in a counterclockwise direction as indicated in FIG. 1 and FIG. 4 continuing around said transfer roll 56 to the right hand end thereof. At the right hand end of the transfer roll 56 the cable 28a extends through the hole 64 into the interior of the roll, thence through the tubular passageway in the boss 68 and to the exterior of the entire reel assembly. The portion of the cable 28a to the extreme right of FIG. 1 is adapted to be connected to some source of electrical power such as a generator or the like either by direct means or by use of a suitable connector device (not shown).

It is emphasized that at the points at which the cable 28 extends thru the respective holes 64 and 66, it may if desired be clamped to the respective transfer rolls 56 and 58. In addition, it is pointed out that while a continuous cable of the same outside dimension throughout may be threaded through the entire transfer roll and cable drum system, a single length of cable of one size or gage may be utilized in going from the extreme right hand side of the structure of the support bracket 22 to the left hand end of the boss 84 on the left hand transfer roll 58 and after passage through the hole 46 at the left hand end of the reel 20, the cable may then be connected by a suitable connector 29 to a cable of a different gage or type which then is wound around the drum 26. The use of two different types of cable may offer several advantages depending upon the type of operation in which the device is to be used. If, for example, the cable being unwound from drum 26 is of heavy gage or includes steel strands, it is likely to be too stiff to be easily wound or unwound from the smaller diameter transfer rolls 56 and 58. A smaller diameter and softer cable, while still having sufficient current carrying capacity, can be more easily transferred between the rolls even though it may lack sufficient strength to be utilized at the payout drum 26. The utilization of a smaller diameter cable on the transfer rolls also allows for a greater storage capacity on drum 26, since as will be described further hereinafter, each turn of cable about one of the transfer rollers allows a storage capacity of two turns around drum 26. It is, however, emphasized, that regardless of whether a single cable 28 is used from the generator or a power source to the power take off at the outermost end of the cable on the drum 26 or whether one cable is used on the transfer rolls and another on the drum, the operation of the instant device is the same and the same advantages flow therefrom.

Hereinafter, in describing the operation of the instant invention, all references to clockwise and counterclockwise motion will be taken with the extreme right hand side of the apparatus as the point of reference and the side from which the apparatus is viewed.

Assuming that the drum 26 is rotating clockwise, as viewed from the right hand end of FIG. 1, and as shown in FIG. 4, the yoke pin 86 will, of course, also rotate clockwise and due to its connection with the yoke 84 will cause clockwise rotation of said yoke. Clockwise rotation of the yoke 84 by virtue of its fixed connection to the transfer roll 58, causes clockwise rotation of the transfer roll 58 about its own axis.

Since the yoke 72 on the right hand end of the right transfer roll 56 is fixedly connected to the transfer roll, by its interconnection with the pin 74, it is therefore in effect fixedly connected to the support pedestal 22. Thus rotation of the reel 26, either in a clockwise or counterclockwise direction does not cause rotation of the right hand transfer roll 56 about its own axis. Since the right hand transfer roll 56 is held against rotation about its own axis and the left hand transfer roll 58 is to the contrary caused to rotate about its own axis for the reasons set forth above, the interaction of the gears 60 and 62 on the transfer rolls 56 and 58 respectively causes the gear on the left hand roll 58 to rotate about its own axis and to roll about the surface of the gear 60 on the right hand transfer roll 56. Thus as roll 58 rotates clockwise, the gear 62 rotates clockwise about its own axis and translates about the surface of the stationary gear 60.

As the gear 62 on the transfer roll 58 rolls about the gear 60, it is, of course, rotating about its own axis and at the same time due to the connection of the transfer roll 58 with the right hand support plate 76 by virtue of rotatably mounted stud 78, pulls the transfer plate 76 around its center of rotation which is the center of the gear 60 on the transfer roll 56. Thus the right hand support plate 76 rotates about its center.

As the right hand support plate 76 rotates about its axis the support plate connecting bars 92 and 94 which fixedly interconnect the plate 76 and 88 cause the left hand support plate 88 to also rotate clockwise about its center of rotation which is the center of the boss 80 on the left hand transfer roll 58. Accordingly, the transfer rolls 56 and 58 remain parallel to one another at all times and, in effect, it can be said that the transfer roll 58 in addition to rotating about its own axis moves around the transfer roll 56.

By referring to FIGS. 5, 5a, and 5b, a clearer picture of the nature of the instant motion of the transfer roll assembly 36 will be obtained. The arrangement of the elements shown in FIG. 5, corresponds to that shown in FIG. 1 before rotation has started.

As the reel 26 rotates in a clockwise direction, as viewed from the right hand end of FIG. 1, the transfer roll 58 and the gear 62 affixed thereto rotate clockwise about their common axis in the manner shown in FIGS. 5 thru 5b. Since the transfer roll 56 and the gear 60 affixed thereto are affixed against rotation about their common axis, the gear 62 and the transfer roll 58 rotate clockwise and the gear 62 rolls clockwise, enmesh with the gear 60 about said gear from the position shown in FIG. 5, for example, to that shown in FIG. 5a, after a rotation of 90 degrees by the gear 62 about its own axis.

As clockwise rotation of the drum 26 continues, the gear 62 continues rotating clockwise and about the gear 60 to the position shown in FIG. 5b from that shown in 5a after another 90 degrees of rotation about its own axis.

At this point, it is emphasized that the gears 60 and 62 are identical in size and in number of teeth. Since the circle of rotation of the center of the gear 62 has for its center the center of the gear 60, and since the circle of rotation of the gear 62 about gear 60 therefore has twice the radius of gear 60, the circumference of the circle traversed by the center of the gear 62 is equal to twice the circumference of the gear 60.

Thus referring to FIGS. 5, 5a, and 5b, although the gear 62 has in relation to space rotated 360 degrees about its own axis as has the drum 26, in going from the position shown in FIG. 5 to that shown in FIG. 5b, as may be seen by the indicated tooth indicia marks, it has rotated, due to its translation about the gear 60, only 180 degrees relative to the surface of said gear and thus has taken up half a turn of wire on to itself and from the transfer roll 56. In order to make one complete revolution about the axis of the gear 60 in the nature of a planetary gear, the gear 62 makes two complete revolutions in space as does the drum 26. In going from the position shown in FIG. 5b back to that shown in 5 in a clockwise direction, the gear 62 will rotate another 360 degrees relative to space and 180 degrees relative to the center of the gear 60, and thus in going completely around the gear 60, the gear 62 takes up one complete turn of cable onto itself and from the transfer roll 56 thus avoiding any possibility of slack occurring between the two transfer rolls.

Thus the operation can in a sense be summed up by saying that for every two complete revolutions of the drum 26 about its center of rotation the gear 62 and thus the left hand transfer roll 58 rotates once about the center of the right hand transfer roll 56 thus taking up one turn of cable onto itself and from the right hand transfer roll 56. As previously indicated, this phenomenon is a result of the fact that the gear 62 is rotating about its own axis and is rolling on the gear 60 about the axis of said gear 60. It is emphasized that these relative movements referred to above will always prevail as long as the gears 60 and 62 are of the same size and the gear 60 is fixed against rotation about its own axis.

As the drum 26 continues to rotate in a clockwise direction, as viewed from its right hand end, cable will be wound thereon until all of the cable has been wound from the right hand take-up roll 56 onto the left hand take-up roll 58. At this point, all of the cable will have been transferred to the take-up roll 58 and will occupy said roll from its extreme left hand end to its extreme right hand end.

At this time clockwise rotation of the drum 26 must be terminated otherwise the end of the cable extending thru the hole 64 in the right hand transfer roll 56 will tend to be pulled from said hole and if it is clamped at said hole, it will tend to break. Thus after complete transfer of cable from one transfer roll to another direction of rotation of the drum 26 must be reversed. However, and most importantly from the standpoint of this invention, it is emphasized and should be clear that since the transfer roll 56 and thus the gear 60 and boss 68 attached thereto are at all times fixed relative to the support 22 there is no rotation of the transfer roll and thus no twisting of the cable extending from the right hand end of said transfer roll and to a power generating source. At the left hand end of the instant reel assembly 20, the cable 28, of course, rotates with the drum and the left hand transfer roll 58. Since there is no relative difference between the rate of rotation of the transfer roll 58 and the drum 26, there can be no relative movement or twisting of cable 28 at the left hand end of the reel assembly. Since drum 26 makes 2 revolutions for each transfer of one turn from one transfer roll to the other and since the circumference of drum 26 is much larger than that of the transfer rolls, a large drum capacity can be realized. Thus the instant invention makes possible the transfer of high currents to a drum reel assembly without the use of slip rings and/or commutators and appropriate brushes, which type of construction tends to cause arcing at the brushes with ensuing wear and current losses as well as pulsations in the current as the brushes cross the gap between adjoining slip ring elements or adjoining commutator bars.

Obviously many modifications and variations of the invention are possible in the light of the above teachings. It is therefore to be understood that within the scope of the appended claims, the invention may be practiced otherwise than as specifically described.

What is claimed is:

1. A reel device for winding a current carrying electrical cable, comprising an outer drum having a pair of side walls extending beyond the periphery of said drum, a series of turns of said electrical cable wound on said drum, means for rotating said drum to wind or pay out said cable, a pair of rolls mounted within said outer drum, a portion of said cable being also wound on said rolls; and means including said rolls for maintaining said cable fixed at one end while said drum is rotated whereby said fixed end may be continuously electrically connected to an electric power source.

2. A reel device as defined in claim 1 wherein said means for maintaining said cable fixed at one end include means for preventing one of said pair of rolls from rotating as said drum is rotated, and means whereby said fixed end of said cable is passed out of said reel device from said one of said pair of rolls.

3. A reel device as defined in claim 2 wherein the other of said pair of rolls is mounted for rotation with said drum and means are provided for causing said other roll to rotate about said one roll as it rotates on its axis, whereby said cable is transferred between said pair of rolls.

4. A reel device as defined in claim 3 wherein said means for causing said other roll to rotate about said one roll includes a planetary gear system.

5. A reel device as defined in claim 4 wherein means are provided for connecting said other roll in positive driving relationship to said drum.

6. A reel device for winding a current carrying electrical cable having a payout end and an inner end, comprising a drum having a portion of said electrical cable wound thereon, means for rotating said drum whereby said electrical cable is wound or payed out from said drum, a fixed support upon which said drum is rotatably mounted, and means for maintaining said inner end of said cable fixed with respect to said support whereby said inner end may be fixedly connected to a source of electrical power, said means for maintaining said inner end in a fixed position including a pair of rolls, each having a portion of said electrical cable wound thereon, one of said rolls being mounted for only pivotal motion with respect to said support and the other of said rolls being mounted for both pivotal and rotating motion with respect to said support.

7. A reel device as defined in claim 6 wherein said other of said rolls is positively coupled to said drum so as to be rotated thereby as said drum is rotated, and means are provided for causing said other of said rolls to also rotate about said one roll as it rotates on its own axis whereby portions of said electrical cable are transferred between said rolls.

8. A reel device as defined in claim 7 wherein said means for causing said other roll to rotate about said one roll include a sun gear and a planet gear, said sun gear being fixedly mounted with respect to said one roll and said planet gear being fixedly mounted with respect to said other roll.

9. A reel device as defined in claim 8 wherein said rolls are mounted between a pair of end plates which are freely rotatably mounted on said support and rigidly interconnected by a plurality of members having their opposite ends fixed to said end plates.

10. A reel device for winding a current carrying electrical cable having a payout end and an inner end, comprising a support pedestal, a drum rotatably mounted on said support pedestal and having a portion of said electrical cable wound thereon, said drum having a flange at each end extending outwardly therefrom, means for rotating said drum whereby said electrical cable may be wound on or payed out from said drum, a pair of rolls each having a portion of said electrical cable wound thereon, means for supporting a first of said rolls on said pedestal for pivotal motion with respect thereto, means for preventing said first roll from rotation with respect to said pedestal, means for supporting a second of said rolls for rotation with said drum and for pivotal motion with respect thereto, a first circular gear fixedly attached to said first roll, a second circular gear fixedly attached to said second roll and engaging said first gear, means for maintaining said first and second rolls in parallel relationship with respect to each other, whereby as said second roll is rotated by said drum said second gear traverses the periphery of said first gear in a planetary motion while rotating about its own axis.

11. A reel device as defined in claim 10 wherein said means for maintaining said first and second rolls in parallel relationship include a rigid assembly comprising a pair of end plates between which said pair of rolls are rotatably mounted in parallel relationship and a plurality of rigid members interconnecting said pairs of end plates.

12. A reel device as claimed in claim 11 wherein said means for supporting said first roll comprises a first tubular member having an inner end affixed to one end of said first roll and having an enlarged ball shaped outer end which is universally pivotally mounted within a hole in said support pedestal, said inner end of said electrical cable being passed out of said reel device through said first tubular member; wherein said means for supporting said second roll comprises a second tubular member having an inner end affixed to one end of said second roll and having an enlarged ball shaped outer end which is universally pivotally mounted within a hole in said drum at the axis of rotation thereof, a yoke affixed to the outer surface of said second tubular member, and means on said drum for engaging said yoke to thereby rotate said second roll as said drum is rotated; and wherein a portion of said electrical cable is passed out of said drum through a hole in one of said flanges and is passed to an end of said second roll through said second tubular member whereby as said second roll rotates on its own axis it also travels around the periphery of said first roll thereby unwinding one of said portions of electrical cable from one of said pair of rolls and winding the unwound portion of the cable onto the other of said pair of rolls.

13. A reel device as defined in claim 10 wherein said means for supporting said first roll comprises a first tubular member having an inner end affixed to one end of said first roll and having an enlarged ball shaped outer end which is universally pivotally mounted within a hole in said support pedestal, said inner end of said electrical cable being passed out of said reel device through said first tubular member; wherein said means for supporting said second roll comprises a second tubular member having an inner end affixed to one end of said second roll and having an enlarged ball shaped outer end which is universally pivotally mounted within a hole in said drum at the axis of rotation thereof, a yoke affixed to the outer surface of said second tubular member, and means on said drum for engaging said yoke to thereby rotate said roll as said drum is rotated; and wherein a portion of said electrical cable is passed out of said drum through a hole in one of said flanges and is passed to an end of said second roll through said second tubular member whereby as said second roll rotates on its own axis it also travels around the periphery of said first roll thereby unwinding one of said portions of electrical cable from one of said pair of rolls and winding the unwound portion of the cable onto the other of said pair of rolls.

14. A reel device for winding a current carrying electrical cable having a payout portion of a first predetermined diameter and an inner portion of a second predetermined diameter, said payout and inner portions being electrically connected together by electrical connection means, comprising a drum having part of said payout portion of said electrical cable wound thereon, means for rotating said drum whereby said payout portion of said cable may be wound or payed out from said drum, a fixed support upon which said drum is rotatably mounted, and means for maintaining the inner end of said inner portion of said cable fixed at said fixed support with respect to said support whereby said inner end may be fixedly connected to a source of electrical power, said means for maintaining said inner end in a fixed position including a pair of rolls, each having part of said inner portion of said cable wound thereon, one of said rolls being mounted for only pivotal motion with respect to said support and the other of said rolls being mounted for both pivotal and rotating motion with respect to said support.

15. A reel device as defined in claim 14 wherein said other of said rolls is positively coupled to said drum so as to be rotated thereby as said drum is rotated, and means are provided for causing said other of said rolls to also rotate about said one roll as it rotates on its own axis whereby parts of said inner portion of said electrical cable are transferred between said rolls.

16. A reel device as defined in claim 15 wherein said means for causing said other roll to rotate about said one roll include a sun gear and a planet gear, said sun gear being fixedly mounted with respect to said one roll and said planet gear being fixedly mounted with respect to said other roll.

17. A reel device as defined in claim 16 wherein said rolls are mounted between a pair of end plates which are freely rotatably mounted on said support and rigidly interconnected by a plurality of members having their opposite ends fixed to said end plates.

References Cited in the file of this patent

UNITED STATES PATENTS 2,629,027    Piatt _____ Feb. 17, 1953